United States Patent Office 2,982,644
Patented May 2, 1961

2,982,644
PROCESS FOR THE MANUFACTURE OF BERYLLIUM

Jonas Kamlet, New York, N.Y.; Edna Yadven Kamlet, executrix of said Jonas Kamlet, deceased, assignor to E. I. du Pont de Nemours and Company No Drawing. Filed Apr. 14, 1960, Ser. No. 22,092

9 Claims. (Cl. 75—84.4)

This invention relates to a process for the manufacture of beryllium. More particularly, this invention relates to a process whereby metallic beryllium may be manufactured in a state of high purity by the reduction of beryllium fluoride with magnesium and with an efficient utilization and conversion of the raw materials.

The reduction of beryllium fluoride with magnesium metal to yield beryllium is a well known industrial technic and has been described by Kroll (U.S. Patent 1,740,857 (1929)); Kjellgren (U.S. Patent 2,381,291 (1945)); Gadeau (U.S. Patent 2,069,705 (1937)); Adamoli (U.S. Patents 2,193,363-4 (1940)) and by many others.

The reaction of stoichiometric (equimolar) mixtures of beryllium fluoride and magnesium is exothermic and is usually so violent that it is difficult to control in practice. The heat produced by this reaction may volatilize any unreacted magnesium present in the reaction mixture to a degree sufficient to be blown out of the reaction chamber.

However, the most serious problem involved in the reaction of beryllium fluoride with magnesium involves the separations of the endproducts of the reaction and the recovery of the metallic beryllium. The endproducts of the reaction:

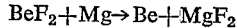

$$BeF_2 + Mg \rightarrow Be + MgF_2$$

are high-melting and difficult to separate in the solid state. Magnesium fluoride melts at 1270° C., beryllium melts at 1283° C. These melting points are too close together (especially in the presence of smaller amounts of other compounds present) to permit an adequate separation of the beryllium from the magnesium fluoride by melting the latter. The refractory nature of the endproducts of the reaction, their insolubility and low reactivity with many solvents and reagents further complicate their separation.

These difficulties have heretofore been overcome in the processes of the prior art by adding fluxes to the beryllium fluoride which serve the double purpose of (a) diminishing the concentration of the $BeF_2$ in the reaction and thereby moderating the exothermic reduction reaction to within controllable velocities, and (b) substantially lowering the melting point of the magnesium fluoride slag so that it may easily be separated in the molten state from the solid metallic beryllium.

The use of sodium fluoride as a flux, added to the beryllium fluoride prior to the reduction with magnesium, has been proposed by Gadeau (U.S. Patent 2,069,705 (1937)), Adamoli (U.S. Patents 2,193,363-4 (1940)) and by others. However, this has not proven to be industrially feasible. Sodium fluoride reacts in the molten state with beryllium fluoride to form double salts with compositions of $2NaF \cdot BeF_2$ and $NaF \cdot 2BeF_2$. The first of these double salts—$2NaF \cdot BeF_2$—reacts with magnesium to form both beryllium and sodium metal. Since this reaction is effected at a temperature above the boiling point of the sodium metal, the latter is volatilized and rendered explosive and highly dangerous. The second of these double salts—$NaF \cdot 2BeF_2$—can be only partially reduced with metallic magnesium and recoveries of beryllium are rarely better than 40% of theoretical, due to formation of stable double salts in the said reaction.

It must be emphasized that beryllium fluoride—the starting material for this process—is a relatively expensive compound. Any process which does not give an efficient utilization of the $BeF_2$ must involve many additional steps for the recovery and processing of the slags, residues and by-products to recover $BeF_2$ or other beryllium values therefrom. These are too valuable to be discarded in any appreciable quantities. The above processes of U.S. Patents 2,069,705 and 2,193,363-4 (1940) (involving as they do a partial conversion of $BeF_2$ to beryllium) must be operated in conjunction with an ancillary process for the recovery and recycling of unused $BeF_2$. This further complicates the process and increases the cost of industrial installation operating the same.

The most widely used industrial process now employed for the manufacture of beryllium involves the use of excess $BeF_2$ as a flux for the $MgF_2$ formed. Beryllium fluoride is reduced with a stoichiometric deficit of magnesium, the excess of $BeF_2$ serving as a reaction diluent and moderator, and to yield low-melting slags with the $MgF_2$ formed (Gadeau, U.S. Patent 2,069,705 (1937); Kjellgren, U.S. Patent 2,381,291 (1945) and Journ. Electrochem. Soc. 93, #4, 122-128 (1948); Derham and Temple, Institute of Mining and Metallurgy, Paper No. 18 (1956)). This process yields slags containing 20% to 50% of $BeF_2$. These slags must be processed for recovery of beryllium values to make the process industrially and economically feasible.

It is the further purpose of this invention to provide a process for the manufacture of beryllium metal wherein beryllium fluoride is reduced with magnesium in near-quantitative yield so that no processing or recovery of beryllium values from the byproduct slag or residues is necessary.

The process of this invention may best be understood by a seriatim description and discussion of the several steps thereof.

The process is initiated by charging a reaction vessel or crucible of suitable construction with a mixture of magnesium metal and beryllium fluoride, said mixture containing from 0.20 to 0.80 gram-atom of Mg for each gram-mole of $BeF_2$, and heating said mixture to the melting point of the magnesium, i.e. 650° C. The exothermic reaction between the Mg and the $BeF_2$ commences immediately and is maintained within a temperature range between 650° C. and 1000° C. It is desirable to keep the temperature from exceeding 1000° C. to avoid excessive volatilization and sublimation of the beryllium fluoride. A reaction temperature between 850° C. and 950° C. is preferred.

As the reaction proceeds, the reaction mixture becomes viscous and finally fluid, due to the formation of lower melting slags of $MgF_2$ and the excess $BeF_2$. As soon as the exothermic reaction has commenced to moderate, further portions of the magnesium metal are added. After each addition, the temperature in the reaction vessel will rise due to the exothermicity of the reaction, and then will commence to subside. During the addition of the magnesium, and the reaction of the magnesium with the beryllium fluoride, the temperature of the reaction mixture should be maintained between 650° C. and 1000° C., and preferably between 850° C. and 950° C.

By this use of an excess of beryllium fluoride at the outset of the reaction, and the subsequent addition of further quantities of magnesium in portions, the highly exothermic reaction is moderated. The heat generated by the reduction is absorbed, as rapidly as it is generated, partially in melting the reagents and partially in further heating of the reaction mixture. This avoids the violent and uncontrollable reactions of the prior art.

The addition of magnesium to the reaction mixture is effected until a total of one gram-atom of magnesium has been reacted with each gram-atom of beryllium fluoride. Thus, if the original charge contained 0.2 gram-atom of Mg and 1.0 gram-mole of $BeF_2$, a further portionwise addition of 0.8 gram-atom of Mg is made; if the original charge contained 0.8 gram-atom of Mg and 1.0 gram-mole of $BeF_2$, a further portionwise addition of 0.2 gram-atom of Mg is made.

I prefer to start the process with a charge of 0.5 gram-atom of Mg per gram-mole of $BeF_2$, and thereafter to add portionwise a further 0.5 gram-atom of Mg, while maintaining the temperature of the reaction mixture between 650° C. and 1000° C., and preferably between 850° C. and 950° C.

When the initial charge is heated, the reaction mixture will become viscous and may melt partially or completely, due to formation of low-melting $MgF_2$-$BeF_2$ slags. However, as additional quantities of magnesium are introduced, the reaction mixture will become more viscous. When a total of one gm.-atom of magnesium has been added for each mole of $BeF_2$, the reaction mixture will have become completely or partially solidified again.

This resolidification represents no difficulty or potential danger as it does in the processes of the prior art. In the processes of the prior art, any unreacted magnesium mechanically occluded in the shell of solid magnesium fluoride may, upon melting the latter, come into contact with overheated molten beryllium fluoride, and a minor explosion may occur. However, in the process of my invention, the magnesium metal will have reacted completely with the $BeF_2$ by the time the reaction mixture re-solidifies, so that the solid or semi-solid reaction product in the reactor or crucible is a mixture of a beryllium metal regulus dispersed in a magnesium fluoride slag, containing substantially no unreacted magnesium.

My process next involves the addition of a quantity of sodium fluoride to the said solid or semi-solid reaction product (containing $MgF_2$ and Be). It must be emphasized that the said sodium fluoride is added only after the substantial completion of the reaction between the $BeF_2$ and the magnesium, but never before. This is an essential feature of the process of this invention. Since there is no substantial amount of free magnesium in the reaction product, there is absolutely no danger of a reaction forming volatile and explosive sodium metal vapors, as described above and by the cited prior art.

The molten salt system-sodium fluoride, magnesium fluoride forms a double salt of composition $NaF \cdot MgF_2$ melting at 1030° C., and two eutectic points, at 1000° C. and at 830° C. By the addition of NaF to $MgF_2$, slags are obtained of the following melting points:

| Moles of NaF per mole of $MgF_2$ | Melting Point of slag |
| --- | --- |
| 0.33 | 1,100° C. |
| 0.36 | 1,000° C. (eutectic point). |
| 1.00 | 1,030° C. (corresponding to $NaF \cdot MgF_2$). |
| 4.00 | 830° C. (eutectic point). |
| 7.00 | 925° C. |
| 9.00 | 960° C. |

Pure sodium fluoride melts at 993° C. Pure magnesium fluoride melts at 1270° C.

Thus, after the conclusion of the reaction between the beryllium fluoride and the magnesium, as above described, I add to the reaction mixture from 0.33 to 9.00 moles of sodium fluoride for each mole of the magnesium fluoride present. A slag containing NaF and $MgF_2$, of melting point indicated in the above table is formed. The sodium fluoride may be added as a solid or as a melt. I prefer to add molten sodium fluoride to the reaction product of $MgF_2$ and beryllium. While from 0.33 to 9.00 moles of NaF may be added per mole of $MgF_2$ present, I prefer to use a minimum of sodium fluoride, i.e. from 0.33 to 0.36 mole per mole of $MgF_2$, and thus to obtain slags melting between 1000° C. and 1100° C.

After the addition of the sodium fluoride, the temperature of the reaction mixture is raised to between the melting point of the slag (i.e. 830° C. to 1100° C., depending on composition), and the melting point of beryllium (i.e. 1283° C.). The solid beryllium may then be separated from the liquid slag of NaF and $MgF_2$. This may be done by decantation or filtration (e.g. through a tantalum wire mesh screen) or by any of the processes of the prior art. The beryllium metal is much lighter than the molten slag and will float on the surface thereof, whence it may be recovered by decantation, skimming, raking, filtration, etc.

The beryllium metal thus obtained may be in a very finely divided form, and somewhat difficult to separate from the slag and to purify. I have therefore found it desirable to raise the temperature of the reaction mixture above the melting point of the beryllium (e.g. to 1300° C.) for several minutes, or for a period of time sufficient to melt the said finely divided particles of beryllium metal and to fuse or coalesce these into larger masses, beads or a solid cake of beryllium metal, which are very easily separated from the reaction. When this is done, the temperature of the reaction mixture is always lowered below 1283° C. to resolidify the fused or coalesced beryllium, prior to separation of the beryllium as a solid from the molten slag of NaF and $MgF_2$. The separation of a solid beryllium product from a molten slag of NaF and $MgF_2$ is an integral feature of this process.

Yields of beryllium metal obtained by this process are from 93% to 96% of theoretical, based on the $BeF_2$ consumed. The beryllium obtained has a purity of from 97.0% to 98.5%. After vacuum melting and the removal of slag inclusions, a product of over 99.5% purity, with less than 0.10% Mg may be obtained.

The raw materials for this process should be as pure as possible, in order to obtain as pure a beryllium product as possible. The $BeF_2$ should be anhydrous and as free as possible of beryllium oxide. Pure magnesium metal should be used. This may be in the form of turnings, powder, granules, dust, dross, raspings or any comminuted form. It is also feasible to use the magnesium in the molten form, particularly for addition to the reaction mixture after the initial reaction (between 0.2-0.8 gm. atoms Mg. and 1.0 gm. mole of $BeF_2$) has been initiated.

The reaction may be effected in any suitable reaction vessel or crucible. In present industrial practice, graphite crucibles or graphite-lined furnaces are employed. These are heated electrically (preferably by high frequency induction) or by direct firing with gas or oil. Any such reaction vessel may be used for effecting the process of this invention. I do not wish this invention to be limited to any apparatus, device or reactor design for effecting the process thereof.

A graphite reactor crucible of suitable design for use in the process of this invention has been described by Derham and Temple (cited above), but I do not, of course, wish to be limited thereto. Other reaction vessels suitable for use in this process are described in the prior art.

The following example is given to define and to illustrate this invention but in no way to limit it to reagents, proportions or conditions described therein. Obvious improvements will occur to any persons skilled in the art. All parts given are parts by weight.

*Example*

A graphite crucible is charged with an intimate mixture of 471.0 parts of beryllium fluoride (10 moles) and 121.6 parts of magnesium metal turnings. The reaction mixture is heated to 650° C., to initiate the exothermic reaction. After this reaction has commenced to subside, the reaction mixture is heated to 850° C., and metallic magnesium is added in 20.0 part portions to the mixture, while maintaining the reaction temperature between 850° C. and 950° C., until a total of 121.6 parts of magnesium metal has been added, for a total consumption of 243.2 parts of magnesium (10 moles). The reaction mixture, which becomes liquid after the initiation of the reaction will have become viscous and solid or semi-solid after the addition of all of the magnesium.

In a separate crucible, 151.2 parts of fluoride sodium (3.6 moles) is heated to 1000°–1010° C. and the molten sodium fluoride is introduced into the crucible containing the reaction products of the magnesium and the beryllium fluoride. The entire mixture is then heated at 1025° C. to 1050° C. until the $MgF_2$ has completely dissolved (M. Pt. of the resultant slag is about 1000° C.), and the particles of beryllium metal present in the reaction have floated to the surface of the clear melt.

The reaction mixture is then heated to 1300° C.–1325° C. for a short time (10 to 20 minutes) to coalesce the fine beryllium particles into easily separated beads or cake, after which the reaction mixture is cooled to about 1100° C. (i.e. above the melting point of the slag—1000° C., but below the melting point of the beryllium—1283° C.) until the beryllium beads or cake has solidified. The beryllium, floating on the surface of the melt, is then mechanically removed, e.g. with tongs, rakes or screens.

It has been found desirable (though not essential) to effect the entire process of this invention under an inert atmosphere. Because of the reactivity of beryllium at advanced temperatures with nitrogen and carbon dioxide, for all practical purpose, the use of an inert atmosphere involves effecting the reactions of this process in an atmosphere of argon gas.

The beryllium beads or cake produced as above described is cooled to room temperature in an argon-filled container, leached free of salts with hot water, dried in a steam-heated oven and submitted to the usual vacuum melting refinement prior to being cast into ingots.

The average yield of beryllium metal, of 99.5% purity, is 85.2 parts.

The slag recovered weighs an average of 767.5 parts and analyzes: 78.60% $MgF_2$, 19.50% NaF, 1.83% $BeF_2$ and 0.07% impurities. This is low enough in $BeF_2$ content to make processing for recovery of beryllium values unnecessary.

This slag may, however, be used for the generation of hydrogen fluoride which is employed in the process for recovering pure $BeF_2$ from beryl ore, described in my co-pending patent application Serial No. 25,189, filed April 28, 1960.

Having described my invention, what I claim and desire to protect by Letters Patent is:

1. A process for the manufacture of beryllium which comprises the steps of:

(a) reacting magnesium with beryllium fluoride in the proportions of from 0.20 to 0.80 gram-atom of magnesium for each gram-mole of beryllium fluoride while maintaining the temperature of the reaction mixture at between 650° C. and 1000° C., and thereafter (b) adding further incremental quantities of magnesium to the said reaction mixture, while maintaining the temperature at between 650° C. and 1000° C., until a total of substantially one gram-atom of magnesium has been reacted with each gram-mole of beryllium fluoride, and thereafter (c) adding sodium fluoride to said reaction mixture, in a quantity equivalent to from 0.33 to 9.00 moles of NaF for each mole of $MgF_2$ present in said reaction mixture to form a slag with said $MgF_2$, and thereafter (d) maintaining the temperature of the said reaction mixture above the melting point of the slag containing NaF and $MgF_2$ but below the melting point of the beryllium, and separating the solid beryllium from the molten slag.

2. The process of claim 1 wherein the temperature of the reaction mixture in steps (a) and (b) is maintained between 850° C. and 950° C.

3. The process of claim 1 wherein 0.5 gram-atom of magnesium is reacted with each gram-mole of beryllium fluoride in step (a) and a further total of 0.5 gram-atom of magnesium is reacted with each gram-mole of beryllium fluoride in step (b).

4. The process of claim 1 wherein the sodium fluoride is added in step (c) in the molten form.

5. The process of claim 1 wherein sodium fluoride is added in step (c) in a quantity equivalent to from 0.33 to 0.36 mole of NaF for each mole of $MgF_2$ present in the reaction mixture.

6. The process of claim 1 wherein the reaction mixture obtained after step (c) and containing beryllium and a slag of NaF and $MgF_2$ is maintained at a temperature above the melting point of the beryllium for a period of time sufficient to coalesce the said beryllium, and thereafter is cooled to a temperature below the melting point of the beryllium but above the melting point of the slag for a period of time sufficient to solidify the said coalesced beryllium, and thereafter, separating the solid beryllium from the molten slag.

7. The process of claim 1 wherein the beryllium fluoride employed is substantially free of beryllium oxide.

8. The process of claim 1 wherein the beryllium fluoride is anhydrous.

9. The process of claim 1 wherein all the steps thereof are effected in an atmosphere of argon.

References Cited in the file of this patent

UNITED STATES PATENTS

| | | |
|---|---|---|
| 2,069,705 | Gadeau | Feb. 2, 1937 |
| 2,193,363 | Adamoli | Mar. 12, 1940 |
| 2,193,364 | Adamoli | Mar. 12, 1940 |
| 2,381,291 | Kjellgren | Aug. 7, 1945 |